June 11, 1929.　　　G. M. MEIER　　　1,717,164
FEEDER
Filed Oct. 21, 1924　　　3 Sheets-Sheet 3
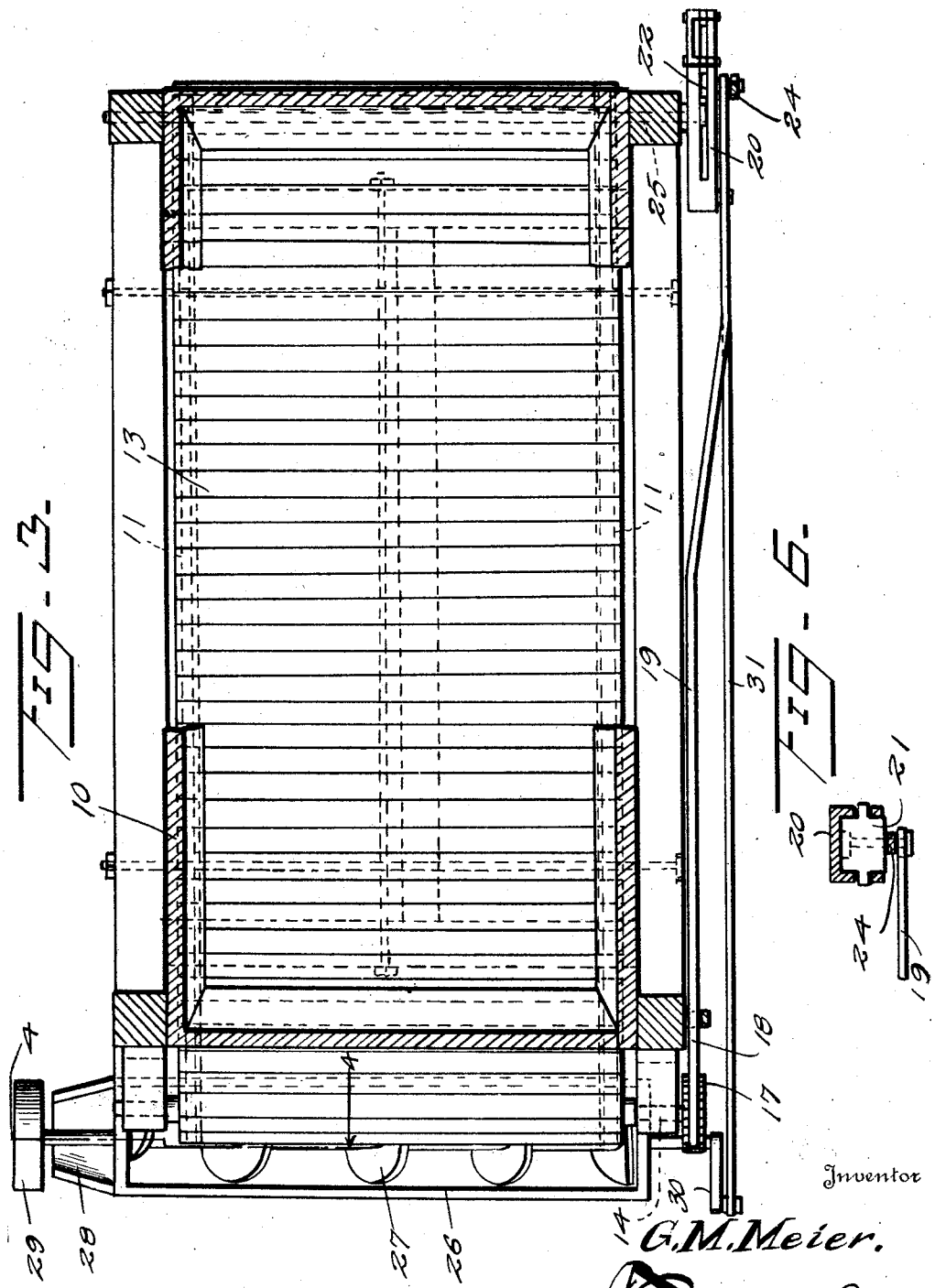
Inventor
G. M. Meier.
By
Attorney

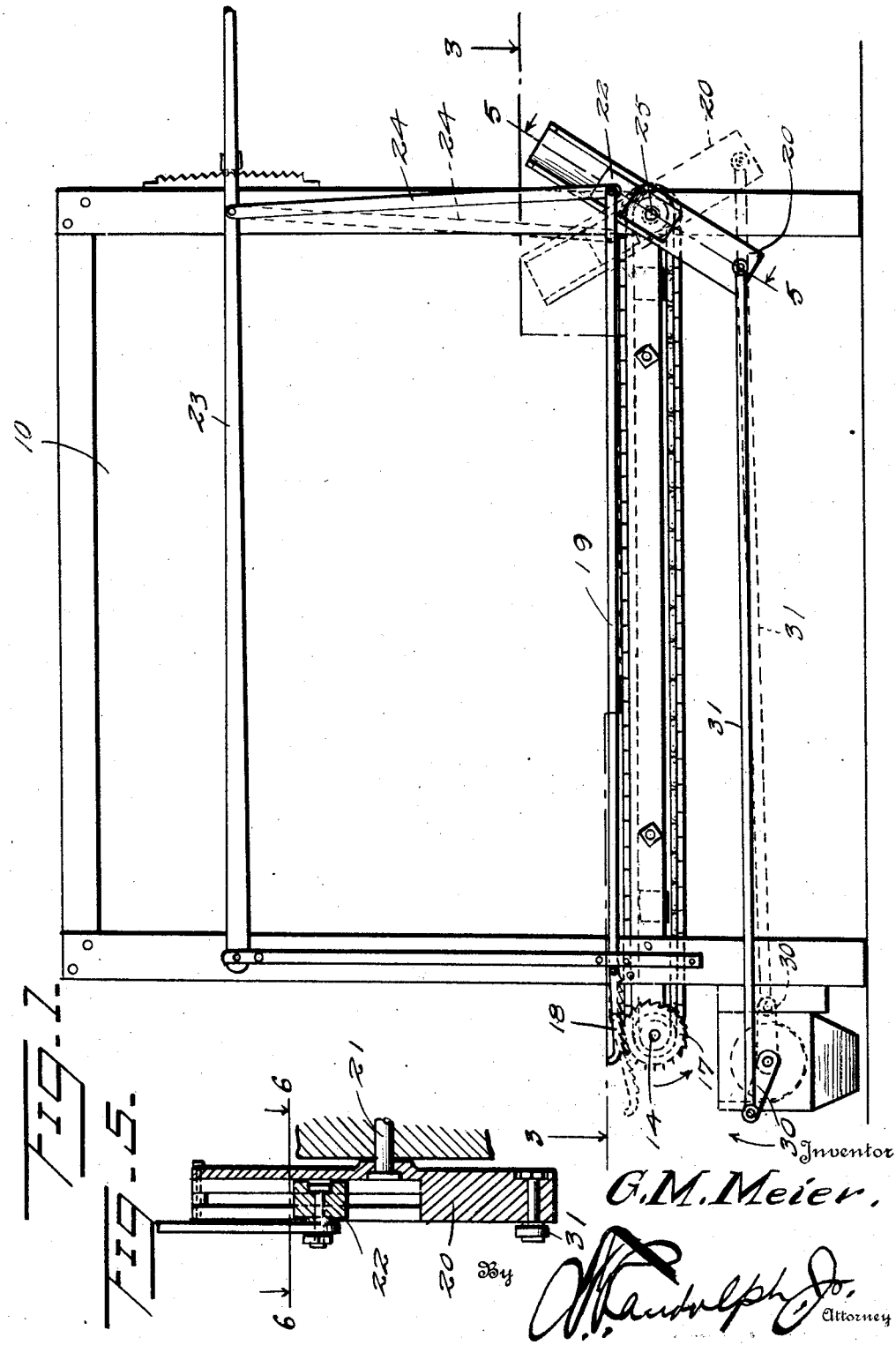

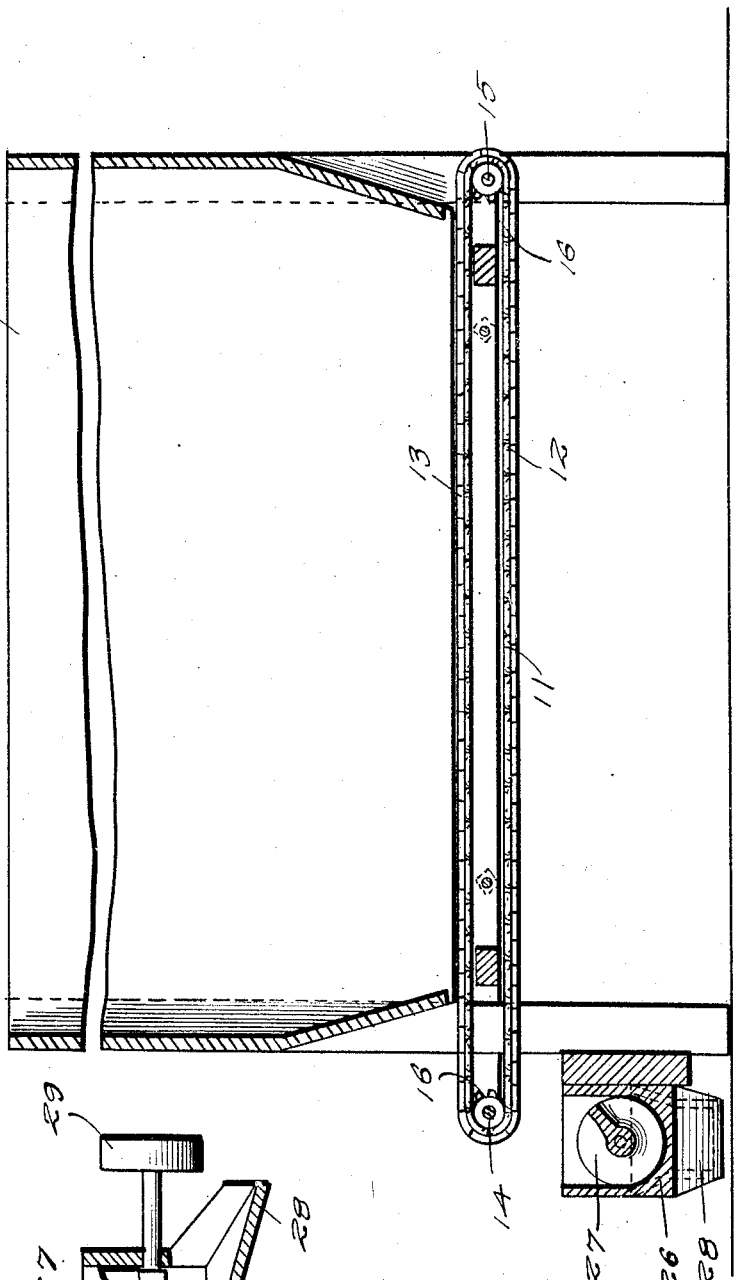

Patented June 11, 1929.  1,717,164

UNITED STATES PATENT OFFICE.

GEORGE M. MEIER, OF PARMA, MISSOURI.

FEEDER.

Application filed October 21, 1924. Serial No. 744,912.

While the primary object of the present invention is the provision of a mechanism for feeding cotton seeds from a seed scale hopper or bin into an air conveyor to be blown into a warehouse, railroad car or into any kind of a machine for processing, milling or cleaning, it is to be understood that it may be adapted to handle waste of all kinds from a saw mill, except the slabs, the material being delivered upon an endless conveyor which may be driven at different speeds or thrown into neutral as required without disturbing the running of the engine.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a side view of a feeder embodying the invention,

Figure 2 is a vertical longitudinal sectional view thereof,

Figure 3 is a horizontal sectional view on the line 3—3 of Figure 1,

Figure 4 is a detail sectional view on the line 4—4 of Figure 3,

Figure 5 is a detail sectional view on the line 5—5 of Figure 1, and

Figure 6 is a sectional view on the line 6—6 of Figure 5.

Corresponding and like parts are referred to in the following description and designated in the several views of the drawings by like reference characters.

The numeral 10 denotes a hopper which is adapted to receive the material such as cotton seed from a seed scale hopper, bin or other source of supply and which is open at the bottom to deliver the material upon an endless conveyor 11 which may be of any approved construction and which as shown comprises endless chains 12 and closely related lags 13 secured to said chains. Shafts 14 and 15 are provided at opposite ends of the hopper 10 and are supplied with sprocket wheels 16 which are positioned to engage the endless chains 12. A ratchet wheel 17 is fast to an end of the shaft 14 and a pawl 18 is provided to cooperate with the teeth thereof. The pawl 18 is pivoted to one end of a rod 19 which is adjustably connected at its other end to a link 20 pivoted intermediate its ends at 21 in line with the shaft 15. A slide 22 is mounted upon the link 20 and may be held in place and directed in its movement in any preferred way, said slide operating in a recess formed in the link and held from displacement by a tongue and slot connection therewith, as shown most clearly in Figure 6.

An operating lever 23 is connected with the slide 22 by means of a rod 24 and any suitable means may be provided to cooperate with the lever 23 to hold it in the required adjusted position, and as shown a toothed bar attached to the hopper 10 is in cooperative relation therewith.

A trough 26 located at the delivery end of the conveyor 11 receives the material therefrom and a spiral or screw feeder 27 disposed within the trough moves the material therethrough to the discharge spout 28. A pulley 29 fast to one end of the shaft of the feeder 27 is adapted to receive motion from a suitable source of power and the opposite end of the feeder shaft is provided with a crank arm 30 which is connected by means of a rod 31 with the lower end of the link 20, the latter receiving an oscillatory movement which imparts a reciprocatory movement to the rod 19 whereby the endless conveyor 11 receives an intermittent rotary movement which is controllable by the amplitude of movement of the rod 19. Adjustment of the slide 22 on the link 20 determines the throw of the pawl 18 and the movement of the endless conveyor 11 and when said slide 22 is moved to a position so that the pivot connection of the rod 19 therewith registers with the pivot 21 said link may continue to oscillate without imparting any movement to the rod 19 or endless conveyor 11 as will be readily understood. Upon adjusting the slide 22 on the link to a greater or less distance away from the pivot 21 of the link, the throw of the rod 19 and the degree of movement of the endless conveyor 11 may be regulated to the end that the feed may be accelerated or diminished to suit requirements.

What is claimed is:—

1. A feeder comprising an endless conveyor, rotatable members over which said conveyer is trained, a link pivoted on the same axis as one of said members, means for constantly oscillating said link, a block carried by said link, means operable manually to move said block longitudinally of the link, a rod pivoted to the block, a pawl and ratchet drive connection between said rod and the other of said members, the last mentioned pivot through the movement of the block being adapted to be arranged in coincidence with the said axis or at different distances therefrom for the purpose specified and notwithstanding operation of the parts.

2. A feed mechanism of the class described comprising an endless conveyor, rotatable members over which said conveyor is trained, feeder means to receive material from the conveyor, said means including a feeder shaft, a link pivoted on an axis coincident with that of one of said members, means to constantly oscillate said link through the rotation of said feeder shaft, a rod, a pawl and ratchet drive between said rod and the other of said members, each block to which said rod is pivoted, and means operable notwithstanding the operation of the parts to move said block to dispose the pivot coincident with the said axis or at different adjustments relatively thereto.

In testimony whereof I affix my signature.

GEORGE M. MEIER.